July 20, 1965  G. S. STOYCOS  3,196,089
METHOD OF MAKING HONEYCOMB STRUCTURES
Filed Sept. 15, 1959  2 Sheets-Sheet 2

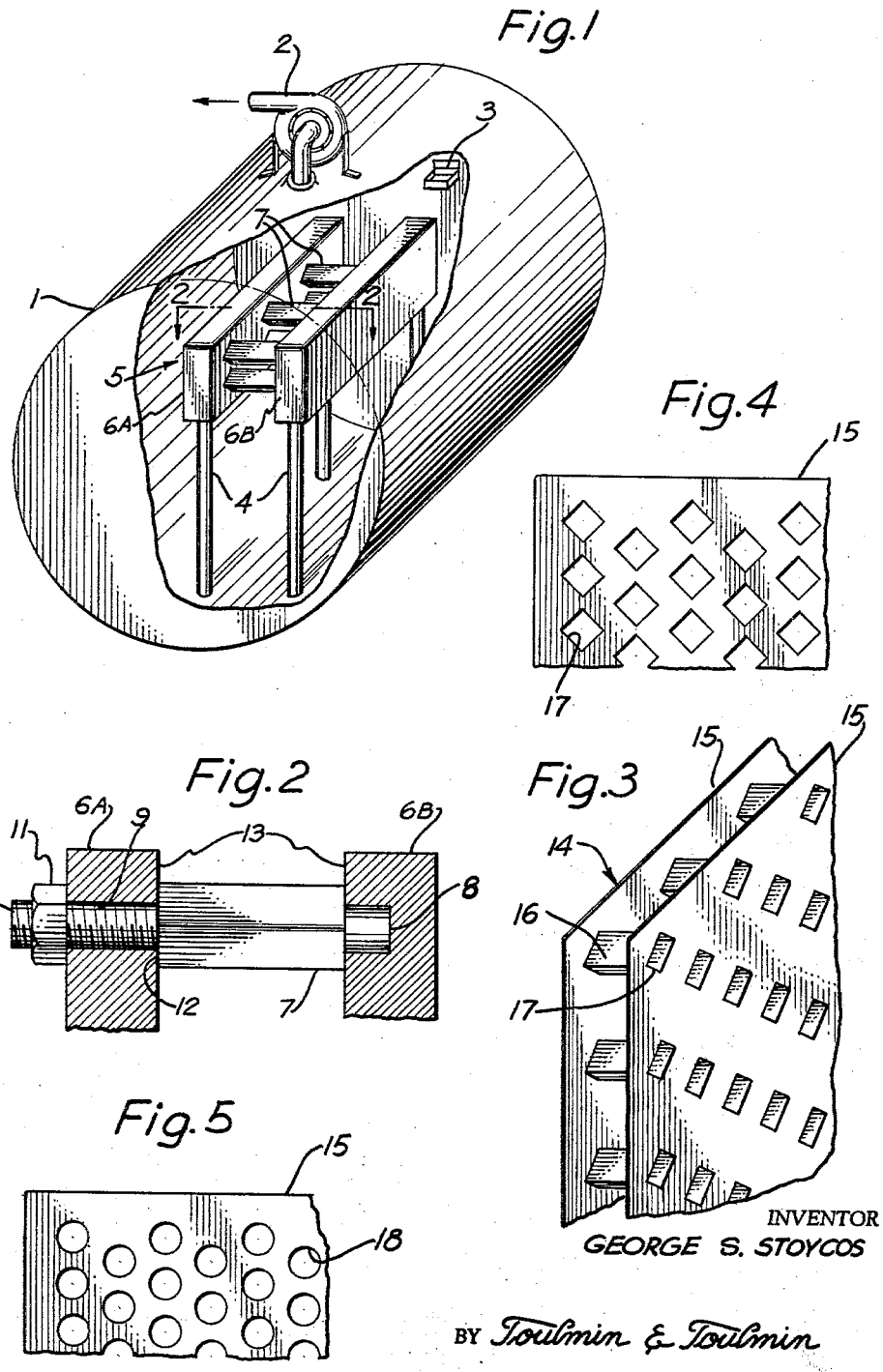

INVENTOR
GEORGE S. STOYCOS

BY Toulmin & Toulmin

ATTORNEYS

United States Patent Office 3,196,089
Patented July 20, 1965

3,196,089
METHOD OF MAKING HONEYCOMB STRUCTURES
George S. Stoycos, Dayton, Ohio, assignor to The Commonwealth Engineering Company of Ohio, Dayton, Ohio
Filed Sept. 15, 1959, Ser. No. 840,176
3 Claims. (Cl. 204—9)

The present invention relates to honeycomb structures, more particularly to a method and apparatus for forming metallic honeycomb structures by plating.

The structure which is known as a honeycomb essentially comprises a pair of spaced parallel flat members known as skins, which are interconnected by a core structure which closely resembles the natural honeycomb. These structures have been receiving increased attention because of the tremendous strength-to-weight ratios incorporated in these honeycomb structures even when the structures are fabricated from lightweight material. Some of the uses to which these honeycomb structures have been put are as structural supports in high-speed aircraft, rockets, and other forms of missiles.

The conventional honeycomb structure such as would be formed from stainless steel comprises a core, as described above, whose openings may vary from 1/16 in. to 1 in. Stainless steel strip which has been vented by a punching operation to allow escape of brazing gases is subsequently used for attaching the skin to the ends of the honeycomb core. The skin is then crimped to the honeycomb structure. Subsequently formed stainless steel strips are resistance-welded along a plurality of joints to complete the structure.

All of the material used in the construction of honeycombs has been fabricated by various techniques, all of which employ a venting, crimping, and complex positioning and indexing operations for proper welding of the nodes.

The present invention discloses an improved method and apparatus for making honeycomb structures. In the present method, two platens are connected at an appropriate distance by a plurality of pegs having a square cross section. These pegs are spaced from each other. A metal is then deposited upon the opposed faces of the platens and the exposed surfaces of the square pegs. This deposition of metal may be by any one of numerous metal-deposition processes. After the desired depth of deposit of metal is obtained, the platens and the pegs are removed from the deposit of metal. The resulting metallic structure is a honeycomb structure wherein the core comprises a plurality of square tubes spaced from each other. These tubes interconnect two parallel flat surfaces known as the skins.

While this structure is only slightly different than the so-called "conventional honeycomb structure," nevertheless the honeycomb structure resulting from this invention has all of the advantages of the so-called "conventional honeycomb structures."

The present method and apparatus for forming metallic honeycombs has a number of outstanding advantages. The use of the plating process eliminates complex mechanical and hydraulic positioning steps, and also complicated welding procedures as commonly required by the current techniques for producing honeycomb structures.

Additional advantages are:

(1) Elimination of brazing operations to attach the skins to the honeycomb core.

(2) The elimination of punched vents at spaced intervals in the metallic strips in order to allow the brazing gases to escape. It is recognized that the presence of these vents reduces the strength-to-weight ratios of the metallic honeycombs.

(3) The elimination of adhesive bonding such as used in lightweight honeycombs comprised of aluminum, paper, or plastic-resin-impregnated paper materials.

(4) The elimination of numerous difficulties involved in processes regarding the brazing of honeycomb skins.

(5) Elimination of difficulties in attaching the skins to the honeycomb core, which difficulties usually arise because of metal growth, carbon blocks, de-scaling, and voids. These difficulties are not present, because of the absence of brazing and heat-treating the honeycomb structures.

It is therefore the principal object of this invention to provide a novel and improved method and apparatus of making honeycomb structures.

It is another object of this invention to provide a method and apparatus for forming honeycomb structures by metal-plating processes.

Other objects and advantages of this invention will be apparent upon reference to the accompanying description when taken in conjunction with the following drawings, wherein:

FIGURE 1 is an over-all perspective view of one form of the apparatus employed for constructing the honeycomb structure, with portions of the wall of the container being removed to show the components within the container;

FIGURE 2 is a sectional view taken along the line 2—2 of FIGURE 1 to show the manner in which the pegs are secured to the platens;

FIGURE 3 is an over-all perspective view of the honeycomb formed by the method and apparatus disclosed as this invention;

FIGURE 4 is a plan view of the honeycomb structure shown in FIGURE 3;

FIGURE 5 is a plan view similar to FIGURE 4 but of a modified form of the honeycomb structure;

Figure 6:
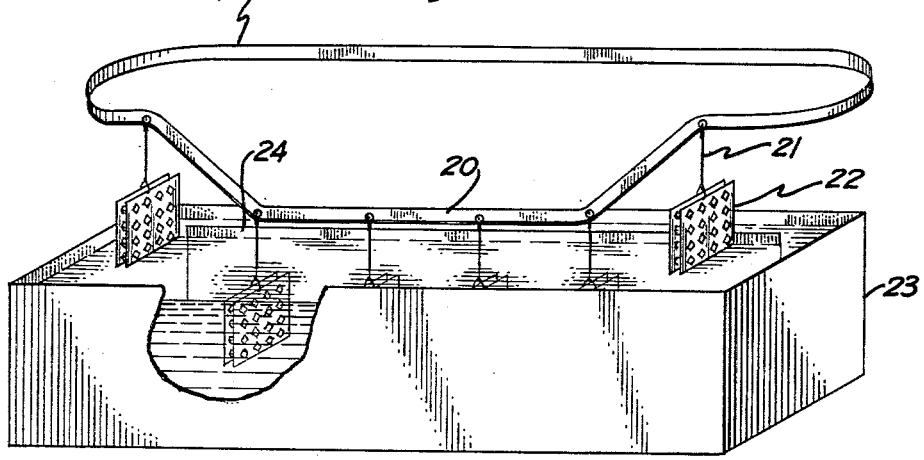
FIGURE 6 is an over-all view showing schematically the apparatus used to form a honeycomb structure by an electro-plating process.

Returning now to the drawings, wherein like reference symbols indicate the same parts throughout the various views, there is illustrated in FIGURE 1 one form of apparatus utilized for constructing honeycombs according to the teachings of this invention. It is pointed out that the specific metal-plating process used is optional. Accordingly, this invention has been described as utilizing a vacuum evaporation process of metal deposit as it is conventionally performed. The structure employed for this process is conventional and known in the art.

In FIGURE 1 the apparatus comprises a closed chamber 1 which may be constructed of stainless steel or a hard glass. Connected to the chamber is a vacuum pump 2 of the oil diffusion type. This pump is capable of maintaining a pressure within the closed chamber of 0.5 micron of mercury or less.

Indicated at 3 is a source of metal vapors. This source may comprise either a magnesia crucible which contains the metal to be evaporated or a refractory metal filament such as tungsten wire having deposits or coatings thereon of metal which is to be deposited.

Mounted upon a supporting structure 4 is the substrate structure or honeycomb pattern 5. This pattern comprises a pair of platen members 6 formed of a suitable metal. These platen members are positioned so that opposed faces thereof are parallel to and spaced from each other.

A plurality of square pegs 7 interconnect the opposed faces of the platen members. These pegs have one end 8 permanently secured to one of the platen members 6B, and the other end extends through an opening 9 to the other platen member 6A. The said other end, which is indicated at 10, is threaded and receives a nut 11 on the end thereof, which nut, when tightened, will force the platen member 6A against a shoulder 12 on the peg which divides the threaded portion of the peg from the remainder thereof.

These pegs are spaced from each other so that none of the pegs are in contact to form any closed chambers between the platens.

While the pegs have been described as being square in cross section, pegs of any other desired cross section may be utilized. Such other cross sections may be circular, elliptical, or hexagonal (the shape which is commonly used in conventional honeycomb structures).

With the above structure in mind, the process of forming the honeycomb structure is now basically a vacuum evaporation process which will deposit a metallic layer on the surfaces of the honeycomb pattern. The metallic vapor is formed within the closed chamber, and this vapor condenses upon the opposed faces 13 of the platen members and on the exposed peripheral surfaces of the pegs 7. This metal vapor may comprise nickel, silver, aluminum, chromium, or any other suitable metal.

When the process has been continued a sufficient period of time so that the depth of the deposit of metal reaches a predetermined thickness, the vacuum evaporation process is terminated and the platen members and the pegs are removed and separated from the metallic structure. This resulting metallic structure is indicated at 14 in FIGURE 3 of the drawings.

This structure comprises skins 15 which are interconnected by a plurality of square tubes 16 corresponding in shape to the pegs 7. The ends of the tubes 16 are open as shown at 17.

In FIGURE 5 there is shown a plan view of a modified honeycomb structure wherein the skins 15 are interconnected by tubes having a circular cross-section. These tubes are also open on the surfaces of the skins as shown at 18.

A honeycomb structure such as that disclosed in the present invention may be readily formed by an electro deposition process such as the process commonly referred to as electro-plating. In forming the honeycomb structures by electro-plating, an apparatus such as that illustrated in FIGURE 6 is used. This apparatus comprises an endless conveyor 19 having a depending portion 20 with a plurality of hangers 21 attached to the conveyor chain. The hangers 21 each support a honeycomb pattern indicated at 22 which is dipped into a tank 23 when the hangers are conveyed over the depending portion 20 of the endless conveyor. The tank 23 contains an electrolyte and an anode formed from the material which is to be plated on the honeycomb pattern. In the event honeycomb structures are to be formed from copper, the electrolyte would comprise a copper sulfate solution with copper plates submerged in the solution at 24 to act as anodes. The honeycomb pattern 22 is suitably energized as it passes through the tank so as to act as a cathode. The honeycomb pattern preferably is first greased or lubricated so as to assist in removing the copper plated thereon in the form of the honeycomb structure. The pattern is similar in all respects to the pattern 14 previously described. Accordingly, as the pattern, which is the cathode, passes through the tank, copper will be transferred from the copper plate 24 to be deposited upon the honeycomb pattern to form a honeycomb structure.

While the present invention has been described as utilizing a vacuum evaporation metal deposition process and an electro deposition process, other plating processes may be used. Such processes may comprise a hot-dip process, a zinc galvanizing process, chemical precipitation (especially with respect to silver), chemical reaction of a metal halide in water vapor to form a metallic oxide, and cathodic sputtering of metals or metal oxides in a low-pressure glow discharge. This list of processes is not exhaustive but merely illustrative of several metal deposition processes.

In all of these processes, metal is deposited upon a pattern comprising the platen members and interconnecting pegs as described above.

Substances other than metals, such as various plastics, paper and the like may also be used as a temporary substrate in this process to form the honeycomb structure after which the temporary substrate is removed or separated from the deposited metal.

In the paper modification of this process the same resides in the use of a paper glued pattern having the structure as described above. Upon the deposition of the metal on the paper pattern, the paper will decompose or otherwise disintegrate and hence there will be no need for the step of removing the pattern from the deposited metal as described above when the pattern was metallic.

The honeycomb pattern may also comprise a resin-impregnated paper.

Figure 7:
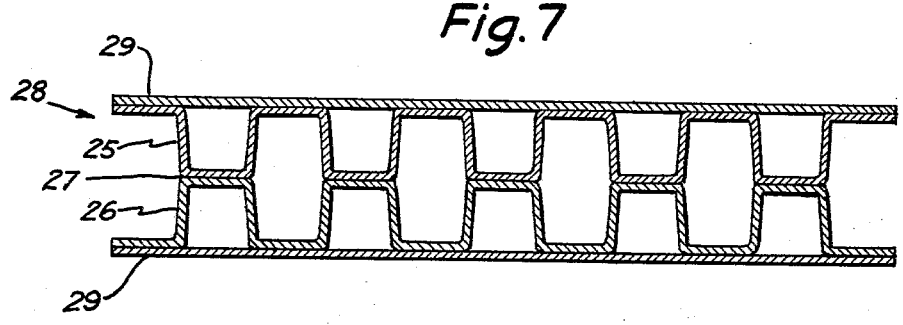
FIGURE 7 is a sectional view through a second modified form of a honeycomb structure.

Another modification of this invention is illustrated in FIGURE 7. Metal is deposited or plated upon a mold similar to a waffle-iron. The two halves of the structures thus formed, 25 and 26, would be bonded together at 27 and the result would be a honeycomb structure 28 having a configuration similar to that of the conventional waffle. Skin surfaces 29 can then be fastened on both sides of the resulting honeycomb structure.

Thus it can be seen that the present invention provides a simplified and economical process and apparatus for the fabrication of architectural structures, particularly honeycombs. The resulting honeycomb structure has much more favorable qualities than the honeycomb structure fabricated by the assembly of the core and skin structures. The honeycomb structure of this invention is a unitary integral unit and does not rely in any way for its strength on the bonds between the core and skin structures of the honeycomb.

It will be understood that this invention is susceptible to modification in order to adapt it to different usages and conditions, and, accordingly, it is desired to comprehend such modifications within this invention as may fall within the scope of the appended claims.

What I claim is:

1. In a method of making a honeycomb structure, the steps comprising positioning a pair of platen members with their opposed faces in parallelism and spaced from each other, one of said platen members having spaced apertures therethrough and the other platen member carrying a plurality of pegs projecting therefrom and extending through said apertures, depositing a thin layer of plating material on both of the opposed faces and on the exposed portions of the pegs so as to form an integral honeycomb structure, and mechanically separating the apertured platen member and the platen member carrying the pegs from the honeycomb.

2. The method of claim 1, in which the plating material is a metal.

3. The method of claim 1, in which the pegs are square in cross-section.

References Cited by the Examiner

UNITED STATES PATENTS

| | | | |
|---|---|---|---|
| 1,242,253 | 10/17 | Siegel | 204—11 |
| 1,428,638 | 9/22 | Jorgensen | 204—9 |
| 1,466,033 | 8/23 | Shepherd et al. | 204—11 |
| 1,609,937 | 12/26 | Forrest | 117—98 |
| 2,037,813 | 4/36 | Munters | 117—31 X |
| 2,113,033 | 4/38 | Poole et al. | 22—57 |
| 2,171,599 | 9/39 | Reid | 22—200 |

(Other references on following page)

UNITED STATES PATENTS

| | | | |
|---|---|---|---|
| 2,281,634 | 5/42 | Stossel | 22—200 |
| 2,704,730 | 3/55 | Glatt | 117—98 |
| 2,713,704 | 7/55 | Pincott | 22—57 |
| 2,793,989 | 5/57 | Goodman et al. | |
| 2,834,690 | 5/58 | Marvin | 117—71 X |
| 2,870,524 | 1/59 | Kinnear. | |

OTHER REFERENCES

Gray, Modern Electroplating, Wiley & Sons, New York, 1953, pp. 246, 247 and 249.

JOHN H. MACK, *Primary Examiner.*

RICHARD D. NEVIUS, JOSEPH REBOLD, JOHN R. SPECK, *Examiners.*